(12) United States Patent
Lee et al.

(10) Patent No.: US 12,697,519 B2
(45) Date of Patent: Aug. 4, 2026

(54) VEHICLE FIRE SUPPRESSION SYSTEM AND CONTROL METHOD THEREOF

(71) Applicants: HYUNDAI MOTOR COMPANY, Seoul (KR); KIA CORPORATION, Seoul (KR)

(72) Inventors: Sang Shin Lee, Suwon-si (KR); Ki Mok Kim, Busan (KR); Man Ju Oh, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 592 days.

(21) Appl. No.: 17/947,910

(22) Filed: Sep. 19, 2022

(65) Prior Publication Data

US 2023/0181956 A1 Jun. 15, 2023

(30) Foreign Application Priority Data

Dec. 15, 2021 (KR) ......................... 10-2021-0179802

(51) Int. Cl.
*A62C 3/07* (2006.01)
*A62C 37/40* (2006.01)
*B60H 1/32* (2006.01)

(52) U.S. Cl.
CPC ................ *A62C 37/40* (2013.01); *A62C 3/07* (2013.01); *B60H 1/3205* (2013.01); *B60H 1/3228* (2019.05)

(58) Field of Classification Search
CPC ......... A62C 37/07; A62C 37/40; A62C 5/002; A62C 3/07; B60H 1/3228

(Continued)

(56) References Cited

U.S. PATENT DOCUMENTS 5,515,691 A * 5/1996 Wertenbach ......... B60H 1/3225
62/133
5,934,379 A * 8/1999 Østlyngen ................ A62C 3/07
169/46

(Continued)

FOREIGN PATENT DOCUMENTS

CN 110075448 A 8/2019
CN 111282177 A 6/2020

(Continued)

*Primary Examiner* — Joseph A Greenlund

(74) *Attorney, Agent, or Firm* — MCDONNELL BOEHNEN HULBERT & BERGHOFF LLP

(57) ABSTRACT

A vehicle fire suppression system capable of quickly extinguishing an initial fire in the event of a vehicle fire by circulating or ejecting an extinguishing fluid through a refrigerant line of a vehicle cooling system, and a control method thereof are provided. The vehicle fire suppression system comprises a vehicle cooling device having a refrigerant line circulating around a compressor, a condenser, an expansion valve, an evaporator, and a gas-liquid separator; an extinguishing fluid container in which an extinguishing fluid is stored; a multi-way valve provided upstream of the compressor on the refrigerant line to control a refrigerant introduced into the compressor, and connected to the extinguishing fluid container to regulate the extinguishing fluid supplied to the compressor; and a controller configured to control the multi-way valve to implement a cooling operation or an extinguishing operation of the cooling device.

14 Claims, 3 Drawing Sheets

(58) Field of Classification Search
USPC ........................................................ 169/47
See application file for complete search history.

(56)                    References Cited

U.S. PATENT DOCUMENTS

| | | | | |
|---|---|---|---|---|
| 10,759,259 | B2 * | 9/2020 | Baumgärtner | ....... B60H 1/3222 |
| 10,960,246 | B2 * | 3/2021 | Stadler | .................... E05F 1/006 |
| 10,967,210 | B2 * | 4/2021 | Herrmann | .............. A62C 35/10 |
| 11,820,201 | B2 * | 11/2023 | Hong | ................ B60H 1/00692 |
| 12,421,874 | B2 * | 9/2025 | Tanaka | .................... F01K 25/08 |
| 2017/0174045 | A1 * | 6/2017 | Shimauchi | ......... B60H 1/00885 |
| 2018/0241092 | A1 * | 8/2018 | Goitsuka | ................ A62C 35/10 |
| 2018/0371955 | A1 * | 12/2018 | Kido | ......................... F01P 3/20 |
| 2019/0193519 | A1 * | 6/2019 | Baumgärtner | ....... B60H 1/3222 |
| 2020/0200049 | A1 * | 6/2020 | Ryu | ........................ F02B 37/12 |
| 2020/0353299 | A1 * | 11/2020 | Lund | .................... A62D 1/0064 |
| 2021/0143383 | A1 * | 5/2021 | Czech | ................ H01M 50/358 |
| 2023/0181956 | A1 * | 6/2023 | Lee | ......................... A62C 37/40 |
| | | | | 169/47 |
| 2024/0145739 | A1 * | 5/2024 | Shin | ................. H01M 8/04731 |

FOREIGN PATENT DOCUMENTS

| | | | | | |
|---|---|---|---|---|---|
| DE | 102006028936 | A | * | 3/2007 | ............. A62C 37/10 |
| DE | 102016200368 | A1 | * | 7/2017 | .............. A62C 3/07 |
| JP | 2006084023 | A | * | 10/2007 | .............. A62C 3/07 |
| JP | 5136790 | B2 | | 2/2013 | |
| JP | 5858229 | B2 | | 2/2016 | |
| JP | 2018133291 | A | | 8/2018 | |
| KR | 1019970039078 | | | 7/1997 | |
| KR | 200121378 | Y1 | | 4/1998 | |
| KR | 1019990034618 | | | 5/1999 | |
| KR | 100414614 | | | 12/2003 | |
| KR | 102143351 | B1 | * | 8/2020 | ............. A62C 37/10 |
| KR | 1020210046331 | A | | 4/2021 | |
| KR | 102254205 | B1 | | 5/2021 | |
| KR | 1020210049079 | A | | 5/2021 | |
| KR | 2024-0084337 | A | | 6/2024 | |

* cited by examiner

VEHICLE FIRE SUPPRESSION SYSTEM AND CONTROL METHOD THEREOF

CROSS REFERENCE TO RELATED APPLICATION

The present application claims priority to Korean Patent Application No. 10-2021-0179802, filed Dec. 15, 2021, the entire contents of which is incorporated herein for all purposes by this reference.

BACKGROUND

Field

The present disclosure relates to a vehicle fire suppression system that can quickly extinguish an initial fire in the event of a fire in a vehicle by circulating or ejecting an extinguishing fluid through a refrigerant line of a vehicle cooling system, and a control method thereof.

Description of the Related Art

Due to the recent global high oil price and $CO_2$ regulations, fuel efficiency improvement and eco-friendliness have become key goals in the field of vehicle development. To achieve this goal, automakers around the world are focusing on developing technologies for hybrid and electric vehicles.

Unlike gasoline vehicles, electric vehicles are composed of a battery, a power converter (inverter), and a motor. The battery is an energy storage device, and the power converter is a device that converts electric energy of the battery into a driving force of a vehicle to operate the motor so as to drive the vehicle.

Electric vehicles have the advantage of being eco-friendly, but if a fire occurs due to an external shock or an internal short circuit, the electric vehicles burn down until the battery is completely burned. When a battery cell catches fire, the fire is not put out until the battery cell is completely burned, and the capacity and size of the battery are quite large, so there is a high possibility that the entire vehicle will burn out.

In fact, while it takes 300 gallons of water to extinguish a fire in an internal combustion engine vehicle, it takes about 100 times as much water to completely extinguish a lithium-ion battery used in an electric vehicle, and it takes up to 24 hours to completely extinguish the fire.

Therefore, in the event of a fire in an electric vehicle using a battery, the initial firefighting is more urgently needed.

On the other hand, even in the case of a conventional internal combustion engine vehicle, most vehicle fires start in an engine room, and most conventional vehicle fire extinguishers are disposed indoors (for example, under the passenger seat), so that when a fire occurs, it is difficult to suppress the fire.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems, and an objective of the present disclosure is to provide a vehicle fire suppression system that can quickly extinguish an initial fire in the event of a fire in a vehicle by circulating or ejecting an extinguishing fluid through a refrigerant line of a vehicle's cooling system, and a control method thereof.

In order to accomplish the above objective, according to an aspect of the present disclosure, there is provided a vehicle fire suppression system including a vehicle cooling device having a refrigerant line circulating around a compressor, a condenser, an expansion valve, an evaporator, and a gas-liquid separator, an extinguishing fluid container in which an extinguishing fluid is stored, a multi-way valve provided upstream of the compressor on the refrigerant line to control a refrigerant introduced into the compressor, and connected to the extinguishing fluid container to regulate the extinguishing fluid supplied to the compressor, and a controller configured to control the multi-way valve to implement a cooling operation or an extinguishing operation of the cooling device.

The vehicle fire suppression system according to the present disclosure may further include a sensor provided on the refrigerant line to measure a temperature or pressure of the refrigerant, and the controller may be configured to terminate an operation of the cooling device when the temperature or pressure detected by the sensor is abnormal.

The sensor of the vehicle fire suppression system may be provided upstream or downstream of the compressor on the refrigerant line.

The controller of the vehicle fire suppression system may be configured to stop the operation of the compressor and completely open the expansion valve when the operation of the cooling device is terminated due to an abnormality in the temperature or pressure of the refrigerant.

The controller of the vehicle fire suppression system may be configured to control the multi-way valve and the compressor to circulate the extinguishing fluid stored in the extinguishing fluid container through the refrigerant line, when the controller receives a fire suppression request signal from parts other than the vehicle cooling device or when the temperature of the refrigerant is abnormal in a state of the expansion valve being completely opened.

The vehicle fire suppression system according to the present disclosure may further include a fire extinguishing nozzle provided on the refrigerant line to eject the extinguishing fluid from the refrigerant line to the outside of the cooling device, and the controller may be configured to control the multi-way valve and the fire extinguishing nozzle to implement the cooling operation of the cooling device, or to implement an extinguishing operation of the cooling device or of the outside of the cooling device.

The controller of the vehicle fire suppression system may be configured to close the fire extinguishing nozzle when the pressure of the refrigerant is less than or equal to a predetermined reference pressure.

The fire extinguishing nozzle of the vehicle fire suppression system may be provided on the refrigerant line adjacent to a driver or electronic parts of a vehicle.

A separate refrigerant discharge port may be provided in the compressor of the vehicle fire suppression system, a branch point may be formed in the refrigerant line between the compressor and the condenser, a separate discharge valve may be provided between the separate refrigerant discharge port and the branch point, and the controller may be configured to control the separate discharge valve to prevent mixing of the extinguishing fluid and the refrigerant in the compressor.

According to another aspect of the present disclosure, there is provided a method of controlling the vehicle fire suppression system, the method including: the step of a controller controlling a cooling operation of a vehicle cooling device when an abnormality occurs in the vehicle cooling device; and the step of the controller controlling a multi-way valve and a compressor to circulate an extinguishing fluid stored in an extinguishing fluid container through a refrigerant line.

In the method of controlling the vehicle fire suppression system, the step of the controller controlling the cooling operation of the vehicle cooling device when an abnormality occurs in the vehicle cooling device may include the sub-step of a sensor measuring a temperature or pressure of a refrigerant, the sub-step of the controller stopping an operation of the compressor and completely opening an expansion valve when the abnormality in the temperature or pressure of the refrigerant is detected by the sensor; the sub-step of the temperature measuring sensor re-measuring a temperature of the refrigerant, and the sub-step of the controller transmitting a failure signal and stopping the operation of the cooling device if there is no abnormality in the re-measured temperature of the refrigerant measured by the sensor.

In the method of controlling the vehicle fire suppression system, the step of the controller controlling the multi-way valve and the compressor to circulate the extinguishing fluid stored in the extinguishing fluid container through the refrigerant line may include the sub-step of the controller controlling the multi-way valve to open a valve connected to the extinguishing fluid container, and the sub-step of the controller operating the compressor to allow the extinguishing fluid to flow into the compressor so that the extinguishing fluid circulates through the refrigerant line of the vehicle cooling device.

The method of controlling the vehicle fire suppression system may further include the step of the controller controlling a separate discharge valve so that the extinguishing fluid and the refrigerant are not mixed in the compressor, before the sub-step of the controller operating the compressor to allow the extinguishing fluid to flow into the compressor so that the extinguishing fluid circulates through the refrigerant line of the vehicle cooling device.

The method of controlling the vehicle fire suppression system may further include the step of the controller receiving a fire suppression request signal from a part other than the vehicle cooling device, and the step of the controller, upon the receipt of the fire suppression request signal, controlling a fire extinguishing nozzle provided in the refrigerant line to eject the extinguishing fluid circulating through the refrigerant line out of the cooling device.

The step of controlling the fire extinguishing nozzle provided in the refrigerant line may include the step of the controller opening the fire extinguishing nozzle to eject the fire extinguishing fluid out of the refrigerant line, and when a pressure of the refrigerant is below or equal to a predetermined reference pressure, closing the fire extinguishing nozzle.

According to the vehicle fire suppression system and the control method thereof, the extinguishing fluid is circulated or ejected through the refrigerant line of the vehicle cooling device, so that it is possible to quickly suppress the initial fire in the event of a vehicle fire.

4

Figure 1:
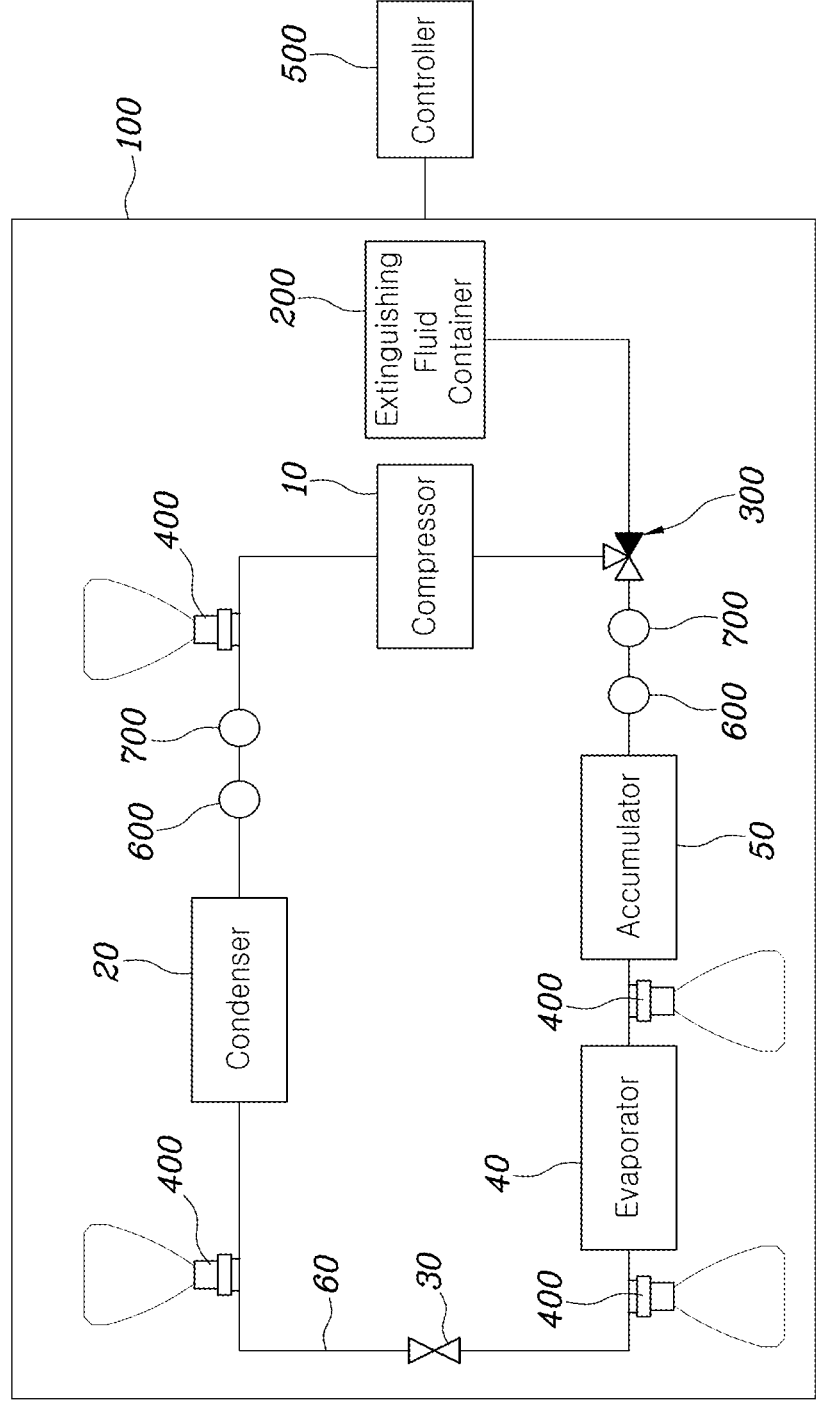
FIG. 1 is a block diagram illustrating a vehicle fire suppression system according to an embodiment of the present disclosure.
Figure 2:
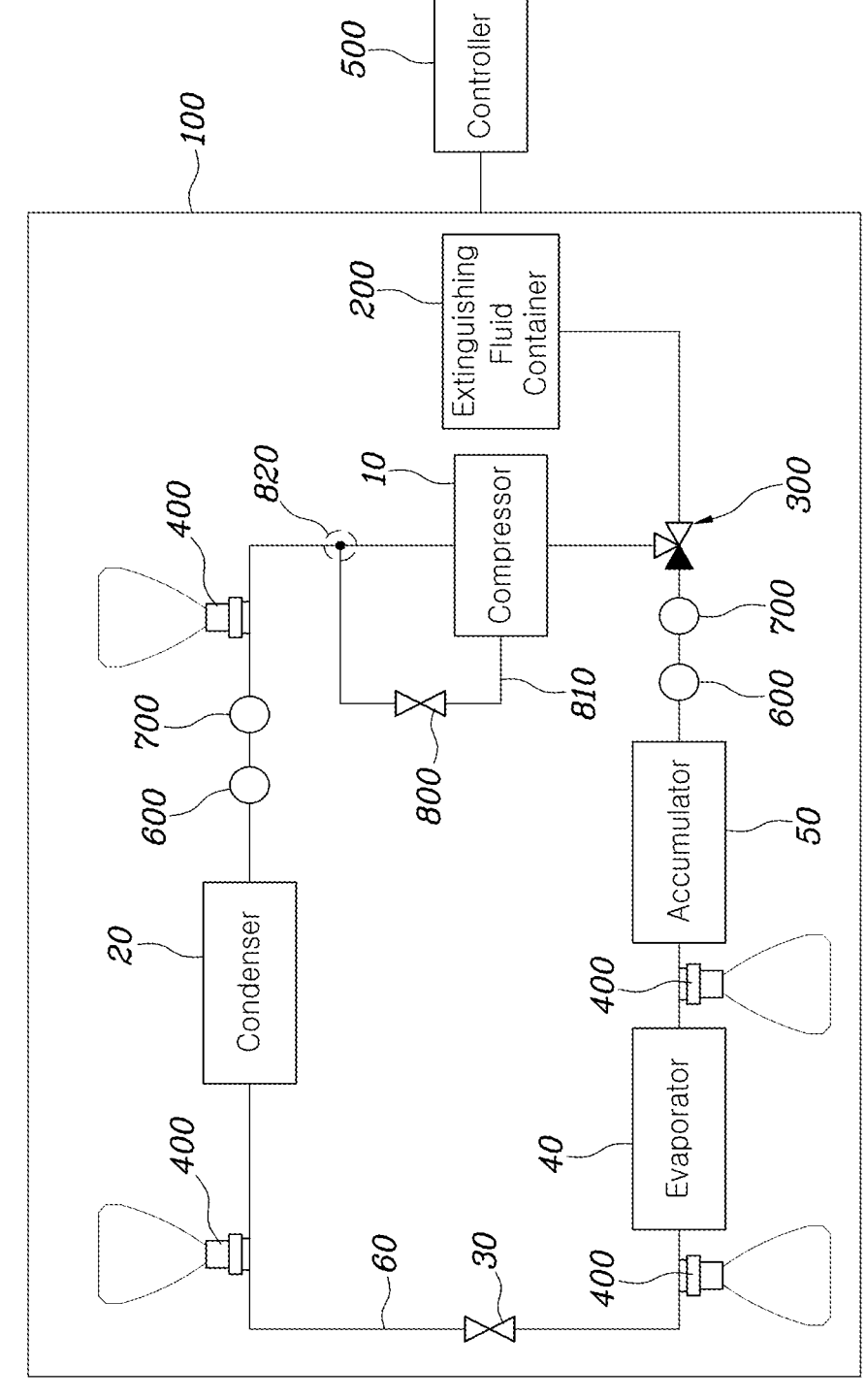
Figure 3:
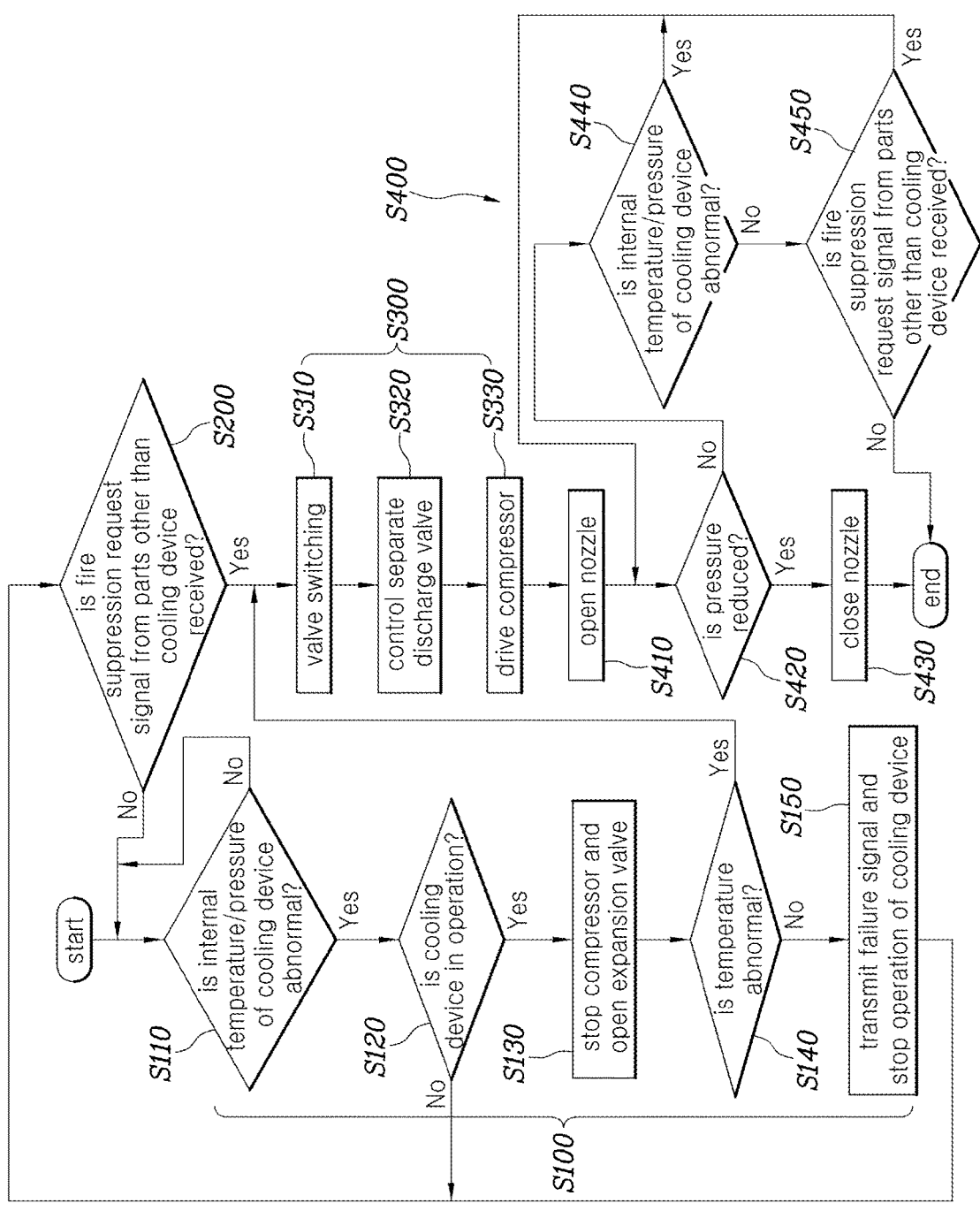

FIG. 2 is a block diagram illustrating a vehicle fire suppression system further including a separate discharge valve in the configuration of FIG. 1; and FIG. 3 is a flowchart of a method of controlling a vehicle fire suppression system according to an embodiment of the present disclosure.

DETAILED DESCRIPTION

Throughout this specification, when a certain element "includes" a certain component, it means that other components may be further included, rather than excluding other components, unless otherwise stated.

On the other hand, in describing the embodiment of the present disclosure, the position of each component is described based on a flow direction of the fluid, such as a refrigerant, unless otherwise specified. For example, it should be construed that in the flow of a fluid, a component through which the fluid passes relatively early is located at an upstream point, and a component through which the fluid passes relatively later is located at a downstream point.

Hereinafter, the configuration and operating principle of various embodiments of the disclosed disclosure will be described in detail with reference to the accompanying drawings.

FIG. 1 is a block diagram illustrating a vehicle fire suppression system according to an embodiment of the present disclosure, FIG. 2 is a block diagram illustrating a vehicle fire suppression system further including a separate discharge valve 800 in the configuration of FIG. 1, and FIG. 3 is a flowchart of a method of controlling a vehicle fire suppression system according to an embodiment of the present disclosure.

Referring to FIGS. 1 and 2, the vehicle fire suppression system may include a vehicle cooling device 100 having a refrigerant line 60 circulating around a compressor 10, a condenser 20, an expansion valve 30, an evaporator 40, and a gas-liquid separator 50 (also referred to as an accumulator). The vehicle fire suppression system may further include an extinguishing fluid container 200 in which an extinguishing fluid is stored, a multi-way valve 300 not only provided upstream of the compressor 10 on the refrigerant line 60 to control a refrigerant introduced into the compressor 10, but also connected to the extinguishing fluid container 200 to regulate the extinguishing fluid supplied to the compressor 10, a fire extinguishing nozzle 400 provided on the refrigerant line 60 to eject the extinguishing fluid in the refrigerant line 60 out of the vehicle cooling device 100, and a controller 500 configured to control the multi-way valve 300 and the fire extinguishing nozzle 400 to implement a cooling operation of the cooling device 100 or an extinguishing operation of the cooling device 100 or outside of the cooling device 100.

The controller 500 according to an exemplary embodiment of the present disclosure may be implemented through a non-volatile memory (not shown) configured to store an algorithm configured to control the operation of various components of a vehicle or data regarding software instructions for reproducing the algorithm, and a processor (not shown) configured to perform operations described below using data stored in the corresponding memory. Here, the memory and the processor may be implemented as individual chips. Alternatively, the memory and the processor may be implemented as a single integrated chip, and the processor may take the form of one or more processors.

In general, the vehicle cooling device 100 uses a heat pump system. A general heat pump system transfers thermal energy through heat exchange of a refrigerant during circulation through an 'evaporation-compression-condensation-expansion' structure circuit, and uses the basic principle that the temperature rises during compression and decreases during expansion.

That is, like an air conditioner, the heat pump system has basic components such as the evaporator 40, the compressor 10, the condenser 20, the expansion valve 30, and the like, wherein the compressor 10 is only supplied with a gas-state refrigerant for obtaining maximum heat efficiency, and also has an internal heat exchanger for heat exchange with the refrigerant for additionally improving the heat efficiency.

Here, the evaporator 40, the compressor 10, the condenser 20, the expansion valve 30, etc. may be manufactured into various shapes capable of performing respective functions of the corresponding components. In particular, the evaporator 40, the compressor 10, the condenser 20, the expansion valve 30, etc. may have any internal configuration as long as they can perform the respective functions of the corresponding components.

In addition, a refrigerant line 60, through which a refrigerant flows, is provided in the heat pump system so that the refrigerant circulates through respective components along the refrigerant line 60.

That is, the vehicle fire suppression system according to the present disclosure uses this common cooling device 100 to circulate the extinguishing fluid into the refrigerant line 60 of the cooling device 100, and a fire extinguishing nozzle 400 is provided on the refrigerant line 60, through which the fire extinguishing fluid in the refrigerant line 60 is ejected out of the cooling device 100 to suppress the fire occurring in a vehicle.

Specifically, the vehicle fire suppression system according to the present disclosure further includes an extinguishing fluid container 200 in which an extinguishing fluid is stored, a multi-way valve 300 which is provided upstream of the compressor 10 on the refrigerant line 60 to connect the refrigerant line 60 between the compressor 10 and the extinguishing fluid container 200, and a controller 500 which is configured to control the multi-way valve 300 and the fire extinguishing nozzle 400.

The multi-way valve 300 may serve to control a flow rate of the refrigerant circulated back to the compressor 10 after passing through the compressor 10, the condenser 20, the expansion valve 30, the evaporator 40, and the gas-liquid separator 50, and to control a flow rate of the extinguishing fluid supplied from the extinguishing fluid container 200 to the compressor 10 as well.

That is, in a normal driving mode of the cooling device 100, the valve connected to the extinguishing fluid container 200 is closed so that the refrigerant is circulated inside of the cooling device 100, and in case of fire or upon the estimation of a fire, the valve connected to the extinguishing fluid container 200 is opened so that the extinguishing fluid is introduced into the cooling device 100.

Here, the multi-way valve 300 may be configured as a 3-way valve as illustrated in FIGS. 1 and 2. In this case, the flow rates of the refrigerant flowing from the downstream points of the compressor 10, the gas-liquid separator 50, and the extinguishing fluid container 200 may be adjusted. That is, when the valve connected to the extinguishing fluid container 200 is opened so that the extinguishing fluid flows into the cooling device 100, the valve connected to the gas-liquid separator 50 is closed so that the extinguishing fluid is not disturbed by the refrigerant, but easily introduced into the cooling device 100. However, it is natural that the multi-way valve 300 may not necessarily be composed of a 3-way valve as illustrated in FIGS. 1 and 2, and the multi-way valve may be composed of various multi-way valves 300, such as a 4-way valve or the like, if necessary. That is, the above 3-way valve is only an illustrative example for helping the understanding of the present disclosure, so the content of the present disclosure should not be considered as being limited due to such a description.

On the other hand, the gas-liquid separator 50 generally refers to a device that allows only a gaseous refrigerant to flow into the compressor 10. The gas-liquid separator 50 of the fire suppression system according to the present disclosure may perform an additional function, in addition to the above conventional function.

The refrigerant used in the conventional cooling device 100 has high flammability or ignitability. Therefore, when the refrigerant and the extinguishing fluid are mixed, there is a problem in that the extinguishing performance of the extinguishing fluid is reduced by the mixed fluid. In addition, in the event of a fire, the refrigerant in the cooling system should be removed quickly so that the refrigerant does not ignite.

Therefore, in the fire suppression system according to the present disclosure, in case of fire or upon the estimation of the occurrence of a fire, the refrigerant remaining in the refrigerant line of the cooling device 100 is stored in the gas-liquid separator 50 before the valve connected to the extinguishing fluid container 200 is opened so that the extinguishing fluid is introduced into the cooling device 100.

That is, the gas-liquid separator 50 serves to allow only gaseous refrigerant to flow into the compressor 10 when the conventional cooling device 100 is driven, and to store the refrigerant remaining in the refrigerant line so as to prevent the refrigerant from being mixed with the extinguishing fluid in case of fire or when there is a risk of fire.

On the other hand, depending on whether the fire extinguishing nozzle 400 is opened or closed, a problem of backflow of remaining refrigerant stored in the gas-liquid separator 50 may occur. The fire suppression system according to the present disclosure also attempts to solve this problem by controlling the fire extinguishing nozzle 400 with the controller 500, which will be described later with reference to the detailed control operation of the fire extinguishing nozzle 400 by the controller 500.

Additionally to facilitate the understanding of the present disclosure, the multi-way valve 300 in FIG. 1 is in a state in which the valve connected to the extinguishing fluid container 200 is closed, and the multi-way valve 300 in FIG. 2 is in a state in which the valve connected to the gas-liquid separator 50 is closed.

In addition, the extinguishing fluid is a liquid fluid that is used for fire suppression, and in view of the characteristics of fire suppression applications, requires non-combustible or relatively high insulation performance, as well as a low boiling point, preferably, to obtain a high extinguishing effect. For reference, as a fluid having such characteristics, a refrigerant used in an immersion cooling method in various industrial fields may also be utilized as a fire extinguishing fluid.

Meanwhile, the controller 500 implements a cooling operation of the cooling device 100 and fire extinguishing inside or outside of the cooling device 100. That is, during the cooling operation of the cooling device 100, the controller drives the compressor 10, controls the expansion valve 30 and the multi-way valve 300, and renders the fire extinguishing nozzle 400 closed. When extinguishing the inside of the cooling device 100, the multi-way valve 300 is controlled so that the extinguishing fluid flows from the extinguishing fluid container 200 into the refrigerant line 60, and when extinguishing the outside of the cooling device 100, the fire extinguishing nozzle 400 is opened so that the fire extinguishing fluid introduced into the refrigerant line 60 is ejected out of the cooling device 100.

Accordingly, the vehicle fire suppression system according to the present disclosure has the effect of quickly extinguishing the initial fire in the event of a vehicle fire by circulating or ejecting the extinguishing fluid through the refrigerant line 60 of the vehicle cooling device 100.

More detailed control operation and effect of the controller 500 will be described for respective characteristic configurations of the present disclosure.

Referring to FIGS. 1 and 2, the vehicle fire suppression system according to the present disclosure is characterized in that the fire suppression system further includes sensors 600 and 700 for measuring a temperature or pressure of a refrigerant provided in the refrigerant line 60, and the controller 500 is configured to stop the operation of the cooling device 100 when the temperature or pressure detected by the sensor is determined to be abnormal.

That is, since the vehicle fire suppression system according to the present disclosure includes a sensor 600 for measuring a temperature of a refrigerant and a sensor 700 for measuring a pressure of a refrigerant, it is possible to recognize the situations of actual or potential fire occurrence in the cooling device 100 in advance. Each of the sensors 600 and 700 determines a fire risk situation by itself through a built-in program and transmits a danger signal to the controller 500. Otherwise, if there is no such program, the sensors only transmit the measured temperature value or pressure value to the controller 500.

If an abnormality in temperature or pressure is determined based on the received danger signal or measured value, the controller 500 is configured to stop the operation of the cooling device 100, thereby preventing additional ignition or flame spread. Here, an abnormal situation in temperature or pressure may be understood as being stored in the memory of the controller 500 as an average value of preset data values through multiple experiments.

Specifically, the vehicle fire suppression system according to the present disclosure may be characterized in that the controller 500 stops the operation of the compressor 10 and completely opens the expansion valve 30 when the operation of the cooling device 100 is stopped.

A fire is more likely to occur when a refrigerant is of high temperature and high pressure. In general, a refrigerant has high-temperature and high-pressure before or after the compressor 10 in the cooling device 100. Then, the refrigerant passing through the expansion valve 30 decreases in pressure according to a throttling action, and the temperature decreases.

Accordingly, when there is an abnormality in temperature or pressure, the controller 500 halts operation of the compressor 10 and completely opens the expansion valve 30 to change the state of the refrigerant from a high temperature, high pressure state to a low temperature, low pressure state.

Accordingly, when a fire is suspected or there is a risk of fire, it is possible to prevent actual ignition by stabilizing the state of the refrigerant.

On the other hand, referring to FIGS. 1 and 2, the vehicle fire suppression system according to the present disclosure is characterized in that the sensors 600 and 700 are provided at an upstream or downstream point of the compressor 10 on the refrigerant line 60.

As previously seen, a fire in a vehicle is highly likely to occur when a refrigerant has high temperature and high pressure, and in the conventional cooling device 100, a high temperature, high pressure refrigerant is formed before or after the compressor 10.

Accordingly, it is preferred that temperature and pressure sensors 600 and 700 be provided before or after the compressor 10 in order to detect whether there is an abnormality in the temperature or pressure of the cooling device 100. Here, the provision of the sensors before or after the compressor 10 can be understood to mean that the sensors 600 and 700 are provided at an upstream or downstream point of the compressor 10.

That is, when the refrigerant circulating through the refrigerant line 60 rapidly increases in the temperature or pressure according to the operation of the compressor 10, the controller quickly detects and responds to this situation to prevent the occurrence of a fire or to enable rapid suppression of the fire.

On the other hand, the controller 500 of the fire suppression system according to the present disclosure may be configured to control the multi-way valve 300 and the compressor 10 such that the extinguishing fluid stored in the extinguishing fluid container 200 is circulated into the refrigerant line 60, upon the receipt of a fire suppression request signal from parts other than the vehicle cooling device 100, or when there is an abnormality in the refrigerant temperature in a state in which the expansion valve 30 is completely opened.

In general, a fire in a vehicle is caused by heat generated from a driving unit or electronic parts of a vehicle. Accordingly, the parts other than the vehicle cooling device 100 may be understood to mean parts having a high fire risk among other vehicle parts, such as a driving unit or electronic parts of a vehicle. Here, the driving unit of a vehicle may be understood to mean an engine, and the electronic parts may be understood to mean a battery, other electronic control unit (ECU), and the like.

For reference, a separate sensor unit (not shown) capable of detecting the occurrence of a fire and a transmitter (not shown) capable of transmitting a fire suppression request signal to the controller 500 of the vehicle fire suppression system may be separately provided in the parts other than the above-mentioned vehicle cooling device 100.

In addition, when the vehicle cooling device 100 is driven, the expansion valve 30 is opened or closed to adjust the degree of pressure reduction of the refrigerant. Therefore, it is generally rare that the expansion valve 30 is completely opened. However, as seen above, in the present disclosure, when there is an abnormality in temperature or pressure, the controller 500 completely opens the expansion valve 30. Even in the completely opened state of the expansion valve 300, the sensor 600 for measuring the temperature continuously measures the temperature of the refrigerant and transmits the result to the controller 500.

In addition, upon receiving a fire suppression request signal from parts other than the vehicle cooling device 100, or when an abnormality in temperature is determined based on a measurement result of the sensor 600 for measuring the temperature in a state in which the expansion valve 30 is completely opened, the controller 500 controls the multi-way valve 300 and the compressor 10 such that the extinguishing fluid stored in the extinguishing fluid container 200 is circulated into the refrigerant line 60.

That is, the multi-way valve 300 is switched from the state of FIG. 1 to the state of FIG. 2 so that the extinguishing fluid flows into the refrigerant line 60, and the compressor 10 is operated so that the introduced extinguishing fluid flows along the refrigerant line 60.

Accordingly, when a fire actually occurs in the cooling device 100 despite the fact that the refrigerant state is stabilized by completely opening the expansion valve 30 to prevent actual ignition, the extinguishing fluid is fed directly into the cooling device 100, thereby providing the effect of suppressing the fire inside of the cooling device 100.

Similarly, when a fire occurs in parts other than the vehicle cooling device 100, the extinguishing fluid is first introduced into the refrigerant line 60, and then is ejected through the fire extinguishing nozzle 400 of the refrigerant line 60, thereby suppressing the fire occurring in parts other than the vehicle cooling device 100.

Hereinafter, a detailed control operation of the fire extinguishing nozzle 400 performed by the controller 500 will be described.

Specifically, the controller 500 of the vehicle fire suppression system according to the present disclosure may be configured to close the fire extinguishing nozzle 400 when the pressure of a refrigerant is less than or equal to a predetermined reference pressure.

That is, when a fire occurs outside of the cooling device 100, the controller 500 is configured to open the fire extinguishing nozzle 400 so that the fire extinguishing fluid flowing inside of the refrigerant line 60 can be ejected out of the cooling device 100. Accordingly, it is possible to extinguish a fire that occurred outside of the cooling device 100 using the extinguishing fluid.

Here, it can be understood that 'the case in which a fire occurs outside of the cooling device 100' means the case including not only the case in which a fire occurs in parts other than the cooling device 100, but also the case in which the fire occurred in the cooling device 100 spreads to the outside of the cooling device 100.

In addition, while the controller 500 controls the fire extinguishing nozzle 400 as described above, the pressure measuring sensor 700 continuously measures the pressure of a refrigerant and transmits the result to the controller 500.

In addition, when the result value received from the pressure measuring sensor 700 is less than or equal to a predetermined reference pressure, the controller 500 closes the fire extinguishing nozzle 400.

As previously discussed, a refrigerant used in the conventional cooling device 100 has high flammability or ignitability. That is, when the internal pressure of the refrigerant line 60 decreases as the fire extinguishing fluid is ejected out of the cooling device 100 through the refrigerant line 60, the refrigerant remaining in the refrigerant line 60 may flow back and then flow toward the outside of the cooling device 100 through the fire extinguishing nozzle 400 together with the extinguishing fluid.

Accordingly, the aforementioned 'predetermined reference pressure' may be understood to mean an initial pressure at which the refrigerant remaining in the refrigerant line 60 starts flowing backward.

As a result, when the result value received from the pressure measuring sensor 700 is equal to or less than the initial pressure at which the refrigerant remaining in the refrigerant line 60 starts flowing backward, the controller 500 closes the fire extinguishing nozzle 400 to prevent the refrigerant remaining in the refrigerant line 60 from flowing backward. Accordingly, there is an effect that can prevent an additional fire caused by the ejection of the refrigerant from occurring.

In addition, the fire extinguishing nozzle 400 of the vehicle fire suppression system according to the present disclosure may be provided in the refrigerant line 60 adjacent to the driving unit or electronic parts of a vehicle.

As described above, in general, a fire in a vehicle occurs in a high fire risk component (e.g., an engine or a battery) such as a driving unit or electronic component of a vehicle. Since these components generate heat when driven, a separate refrigerant line 60 for cooling such components is generally formed adjacent to the heating part of each component.

The refrigerant line 60 in the vehicle fire suppression system according to the present disclosure may also be provided adjacent to the heating parts of the high fire risk components as described above. In addition, the fire extinguishing nozzle 400 is disposed in the refrigerant line 60 adjacent to the high fire risk component as described above.

That is, when a fire occurs in a vehicle, the extinguishing fluid can be sprayed directly on fire-causing parts, thereby enabling more rapid fire suppression.

FIG. 2 is a block diagram illustrating a vehicle fire suppression system further including a separate discharge valve 800 in the configuration of FIG. 1.

Referring to FIG. 2, a separate refrigerant discharge port 810 may be provided in the compressor 10 of the vehicle fire suppression system according to the present disclosure, a branch point 820 may be provided on the refrigerant line 60 between the compressor 10 and the condenser 20, a separate discharge valve 800 may be provided between the separate refrigerant discharge port 810 and the branch point 820, and the controller 500 may be configured to control the separate discharge valve 800 so that the extinguishing fluid and the refrigerant are not mixed in the compressor 10.

When the extinguishing fluid flows into the cooling device 100 by controlling the opening or closing of the multi-way valve 300, the refrigerant may remain in the compressor 10. As illustrated above, since the refrigerant used in the conventional cooling device 100 has high flammability or ignitability, when the refrigerant and the extinguishing fluid are mixed together, there is a problem in that the extinguishing performance of the extinguishing fluid is reduced due to the mixed fluid.

That is, it is preferred that the extinguishing fluid circulates through the refrigerant line 60 at the possible purest concentration. Therefore, in the vehicle fire suppression system according to the present disclosure, the separate refrigerant discharge port 810 is formed in the compressor 10 and the refrigerant is discharged in advance through the discharge port, thereby preventing the refrigerant from being mixed with the extinguishing fluid.

Specifically, the separate refrigerant discharge port 810 is connected to the branch point 820 formed in the refrigerant line 60 between the compressor 10 and the condenser 20, the separate discharge valve 800 is provided between the separate refrigerant discharge port 810 and the branch point 820, and the controller 500 controls the separate discharge valve 800 so that the remaining refrigerant in the compressor 10 is discharged before the extinguishing fluid is introduced into the compressor 10.

At this time, it is preferable that the controller 500 controls the separate discharge valve 800 to be opened before the compressor 10 is driven. This is because when the compressor 10 is driven, the extinguishing fluid is introduced into the compressor 10.

For reference, the compressor 10 used in the vehicle cooling device 100 is divided into a reciprocating compressor and a rotary compressor. The rotary compressor is divided into a vane rotary compressor that employs a rotary shaft and vanes, a scroll compressor that employs a pivot scroll and a fixed scroll, etc. Such a scroll compressor is widely used for refrigerant compression in air conditioners, etc. because of their advantages in that the scroll compressor can obtain a relatively high compression ratio compared to other types of compressors and obtain stable torque through smooth strokes of suction, compression, and discharge of a refrigerant. That is, in the vehicle fire suppression system according to the present disclosure, the separate refrigerant discharge port 810 provided in the compressor 10 may be configured so as to be connected to the separate discharge valve 800 by forming a bypass outlet in the pivot scroll and the fixed scroll in the case of the scroll compressor as described above.

However, this is only an example to help the understanding of the present disclosure, so the separate refrigerant discharge port 810 may be provided in various ways depending on the type of the compressor 10, and the present disclosure should not be considered as being limited by these examples.

FIG. 3 is a flowchart of a method of controlling a vehicle fire suppression system according to an embodiment of the present disclosure.

Referring to FIG. 3, the method of controlling the vehicle fire suppression system may include the step S100 of a controller controlling a cooling operation of a vehicle cooling device when an abnormality occurs in the vehicle cooling device, the step S200 of the controller receiving a fire suppression request signal from a part other than the vehicle cooling device; the step S300 of the controller controlling a multi-way valve and a compressor so that an extinguishing fluid stored in an extinguishing fluid container is circulated through a refrigerant line, and the step S400 of the controller controlling a fire extinguishing nozzle so that the extinguishing fluid circulating through the refrigerant line is ejected out of the cooling device.

Specifically, in the step S100 of the controller controlling the cooling operation of the cooling device upon the occurrence of an abnormality in the vehicle cooling device, when a fire in the cooling device is suspected while the cooling device is being driven, the controller controls the multi-way valve and the fire extinguishing nozzle so that the cooling operation of the cooling device is stopped and the state of the refrigerant is stabilized to prevent actual ignition. That is, this step can be understood as the step of suppressing and blocking the occurrence of a fire in advance.

In the step S200 of the controller receiving the fire suppression request signal from parts other than the vehicle cooling device, as illustrated above, the fire suppression request signal is transmitted from a separate transmitter (not shown) provided in a high fire risk component, such as a driving unit or electronic components of a vehicle, to the controller of the vehicle fire suppression system according to the present disclosure. That is, this step can be understood as the step of recognizing the case in which a fire occurs in a high fire risk component other than the cooling device.

In the step S300 of the controller controlling the multi-way valve and the compressor so that the extinguishing fluid stored in the extinguishing fluid container circulates through the refrigerant line, when a fire occurs in the cooling device, the multi-way valve is opened for extinguishing the fire inside of the cooling device so that the extinguishing fluid stored in the extinguishing fluid container is circulated through the refrigeration line. That is, this step can be understood as the step of suppressing a fire that has occurred inside of the cooling device.

In the step S400 of the controller controlling the fire extinguishing nozzle so that the fire extinguishing fluid circulating through the refrigerant line is ejected out of the cooling device, when a fire occurs outside of the cooling device, the fire extinguishing nozzle is opened for extinguishing the fire outside of the cooling device so that the extinguishing fluid circulating through the refrigerant line is ejected through the extinguishing nozzle. That is, this step can be understood as the step of extinguishing a fire that has occurred outside of the cooling device.

As a result, the method of controlling the vehicle fire suppression system according to the present disclosure includes the plurality of steps as described above, thereby preventing the occurrence of a vehicle fire in advance and enabling rapid fire suppression when an actual fire occurs.

Hereinafter, the configuration and operative principle of the respective step will be described in more detail with reference to FIG. 3.

Referring to FIG. 3, in the method of controlling the vehicle fire suppression system, the step S100 of the controller controlling the cooling operation of the vehicle cooling device when an abnormality occurs in the vehicle cooling device may include, the sub-step S110, S120, S130 of a sensor measuring a temperature or pressure of a refrigerant, the controller stopping an operation of the compressor and completely opening an expansion valve when the abnormality in the temperature or pressure of the refrigerant is detected by the sensor, the sub-step S140 of the temperature measuring sensor re-measuring a temperature of the refrigerant, and the sub-step S150 of the controller transmitting a failure signal and stopping the operation of the cooling device if there is no abnormality in the re-measured temperature of the refrigerant measured by the sensor.

Specifically, the sensor measures the temperature or pressure of the refrigerant and transmits the result to the controller, and the controller determines whether there is an abnormality in the temperature or pressure of the refrigerant in the cooling device (S110). When there is an abnormality in temperature or pressure, the controller determines whether the cooling device is operating (S120), and when the cooling device is in operation, stops the operation of the compressor and completely opens the expansion valve (S130). In a state in which the expansion valve is completely opened, the temperature measuring sensor re-measures the temperature and transmits the result to the controller, and the controller determines whether the temperature of the refrigerant in the cooling device is abnormal (S140). If there is no abnormality in the re-measured temperature, the controller transmits a failure signal and stops the operation of the cooling device (S150).

Here, the failure signal is transmitted to a display unit (e.g., a navigation display or a warning light) separately provided in a vehicle so that a vehicle driver may be informed that a problem has occurred in the cooling system.

Meanwhile, the reason for determining whether the cooling device is operating is to prevent the additional generation of a high-temperature, high-pressure refrigerant by stopping the operation of the compressor because the compressor is being driven while the cooling device is operating.

In addition, if an actual fire occurs even when the state of the refrigerant is stabilized through the opening of the expansion valve, additional control by the controller is required to suppress the fire. Therefore, by re-checking whether the temperature is abnormal, it is possible to determine whether an actual fire has occurred and take corresponding additional measures.

If there is no abnormality in the re-measured temperature, a failure signal is transmitted to the above-mentioned display, etc. to allow the vehicle driver to recognize that the system needs to be repaired, thereby providing the effect of improving the vehicle safety.

On the other hand, in the method of controlling the vehicle fire suppression system, the step S300 of the controller controlling the multi-way valve and the compressor to circulate the extinguishing fluid stored in the extinguishing fluid container through the refrigerant line may include the sub-step S310 of the controller controlling the multi-way valve to open a valve connected to the extinguishing fluid container, and the sub-step S330 of the controller operating the compressor to allow the extinguishing fluid to flow into the compressor so that the extinguishing fluid circulates through the refrigerant line of the vehicle cooling device.

Specifically, the controller controls the multi-way valve to switch the state of FIG. 1 to the state of FIG. 2 so that the extinguishing fluid stored in the extinguishing fluid container flows into the refrigerant line (S310). Then, the controller operates the compressor to allow the extinguishing fluid to flow into the compressor so that the extinguishing fluid circulates through the refrigerant line of the vehicle cooling device (S330).

That is, when a fire occurs inside or outside of the cooling device, the controller controls the multi-way valve to allow the extinguishing fluid to be circulated directly into the refrigerant line so that the fire inside of the cooling device is suppressed or the extinguishing fluid is ejected out of the cooling device through the fire extinguishing nozzle provided in the refrigerant line.

The method of controlling the vehicle fire suppression system may further include the step S320 of the controller controlling a separate discharge valve so that the extinguishing fluid and the refrigerant are not mixed in the compressor, before the sub-step S330 of the controller operating the compressor to allow the extinguishing fluid to flow into the compressor so that the extinguishing fluid circulates through the refrigerant line of the cooling device.

As illustrated above, when the opening or closing of the multi-way valve is controlled so that the extinguishing fluid flows into the cooling device, the refrigerant may remain in the compressor, and the extinguishing performance of the extinguishing fluid may decrease due to the remaining refrigerant.

Therefore, it is preferable to allow the extinguishing fluid to flow through the refrigerant line at the possible purest concentration. To this end, in the method of controlling the vehicle fire suppression system according to the present disclosure, the controller controls the separate discharge valve so that the extinguishing fluid and the refrigerant are not mixed in the compressor.

That is, before the controller operates the compressor to allow the extinguishing fluid to flow into the compressor and circulate through the refrigerant line of the vehicle cooling device (S330), the controller controls the separate discharge valve to be opened so that the refrigerant remaining in the compressor is discharged out of the compressor before the extinguishing fluid is introduced into the compressor (S320).

On the other hand, the method of controlling the vehicle fire suppression system may further include the step S200 of the controller receiving a fire suppression request signal from a part other than the vehicle cooling device, and the step S400 of the controller, upon the receipt of the fire suppression request signal, controlling the fire extinguishing nozzle provided in the refrigerant line so that the extinguishing fluid circulating through the refrigerant line is ejected out of the cooling device.

Here, the step S200 of the controller receiving the fire suppression request signal from a part other than the vehicle cooling device means the step of recognizing the case in which a fire occurs in a high fire risk component other than the cooling device, as illustrated above.

In the step S400 of the controller, upon the receipt of the fire suppression request signal, controlling the fire extinguishing nozzle provided in the refrigerant line so that the extinguishing fluid circulating through the refrigerant line is ejected out of the cooling device, the controller may open the fire extinguishing nozzle to eject the fire extinguishing fluid out of the refrigerant line (S410), and when a pressure of the refrigerant is below or equal to a predetermined reference pressure, the controller may close the fire extinguishing nozzle (S420, S430).

Specifically, when a fire occurs in parts other than the cooling device, or when a fire that occurred in the cooling device spreads to the outside of the cooling device, the controller opens the fire extinguishing nozzle so that the extinguishing fluid circulating through the refrigerant line is ejected out of the cooling device (S410). Further, the pressure measuring sensor measures the pressure of the refrigerant and transmits the result to the controller, and the controller compares the result with a predetermined reference pressure (S420) and determines whether the fire extinguishing nozzle is closed (S430).

Here, as described before, the 'predetermined reference pressure' means an initial pressure at which the refrigerant remaining in the refrigerant line starts flowing backward. That is, when the received result value is equal to or less than the initial pressure at which the refrigerant remaining in the refrigerant line starts flowing backward, the controller closes the fire extinguishing nozzle.

As a result, the fire extinguishing fluid is ejected out of the cooling device through the extinguishing nozzle, thereby extinguishing a fire that occurred outside of the cooling device and preventing an additional fire that may occur due to the backward flow of the remaining refrigerant and erroneous ejection through the extinguishing nozzle.

In addition, after the pressure measuring sensor measures the pressure of the refrigerant, the method may further include the step of the controller determining whether an abnormality has occurred in the vehicle cooling device or whether a fire suppression request signal from parts other than the cooling device is received (S440, S450).

Specifically, the pressure measuring sensor measures the pressure of the refrigerant and transmits the result to the controller, and as a result of comparing the result value received by the controller with the predetermined reference pressure, if the received result value is higher than the predetermined reference pressure, the extinguishing nozzle remains open.

Even when the extinguishing nozzle is opened and the extinguishing fluid is being ejected out of the cooling device, an additional fire may occur.

Therefore, in the method of controlling the vehicle fire suppression system according to the present disclosure, the controller additionally determines whether an abnormality occurs in the vehicle cooling device or whether a fire suppression request signal from parts other than the cooling device is received (S440, S450), which makes it possible to ultimately suppress the fire.

That is, even when the fire extinguishing nozzle is opened, the sensor continuously measures the temperature or pressure of the refrigerant and transmits the result to the controller, and then the controller determines whether the temperature or pressure of the refrigerant in the cooling device is abnormal (S440). As a result, when there is an abnormality in temperature or pressure, the fire extinguishing nozzle remains open, and when there is no abnormality in temperature or pressure, the controller determines whether there is a fire suppression request signal transmitted from a separate transmitter (not shown) provided in high fire risk components other than the cooling device, such as a driving unit or electronic components of ae vehicle, as described above (S450). As in the above case, when there is a fire suppression request signal from components other than the cooling device, the fire extinguishing nozzle is kept open.

Accordingly, there is an effect of not only being able to quickly extinguish the initial fire when a fire occurs in a vehicle, but also preventing the spread of the fire and ultimately suppressing the occurrence of an additional fire.

Although the present disclosure has been described and illustrated with respect to the specific embodiments, it would be obvious to those skilled in the art that various improvements and modifications are possible, without departing from the scope and spirit of the present disclosure as disclosed in the accompanying claims.

What is claimed is:

1. A vehicle fire suppression system comprising:
   a vehicle cooling device having a refrigerant line circulating around a compressor, a condenser, an expansion valve, an evaporator, and a gas-liquid separator;
   an extinguishing fluid container in which an extinguishing fluid is stored;
   a multi-way valve provided upstream of the compressor on the refrigerant line to control a refrigerant introduced into the compressor, and connected to the extinguishing fluid container to regulate the extinguishing fluid supplied to the compressor;
   a controller configured to control the multi-way valve to implement a cooling operation or an extinguishing operation of the cooling device; and
   a fire extinguishing nozzle provided on the refrigerant line to eject the extinguishing fluid from the refrigerant line to the outside of the cooling device,
   wherein a separate refrigerant discharge port is provided in the compressor of the vehicle fire suppression system, a branch point is formed in the refrigerant line between the compressor and the condenser, a separate discharge valve is provided between the separate refrigerant discharge port and the branch point, and the controller is configured to control the separate discharge valve to prevent mixing of the extinguishing fluid and the refrigerant in the compressor.

2. The vehicle fire suppression system according to claim 1, further comprising:
   a sensor provided on the refrigerant line to measure a temperature or pressure of the refrigerant,
   wherein the controller is configured to terminate an operation of the cooling device when the temperature or pressure detected by the sensor is abnormal.

3. The vehicle fire suppression system according to claim 2, wherein the sensor is provided upstream or downstream of the compressor on the refrigerant line.

4. The vehicle fire suppression system according to claim 1, wherein the controller is configured to stop the operation of the compressor and completely open the expansion valve when the operation of the cooling device is terminated due to an abnormality in the temperature or pressure of the refrigerant.

5. The vehicle fire suppression system according to claim 1, wherein the controller is configured to control the multi-way valve and the compressor to circulate the extinguishing fluid stored in the extinguishing fluid container through the refrigerant line, when the controller receives a fire suppression request signal from parts other than the vehicle cooling device or when the temperature of the refrigerant is abnormal in a state of the expansion valve being completely opened.

6. The vehicle fire suppression system according to claim 1, wherein the controller is configured to close the fire extinguishing nozzle when the pressure of the refrigerant is less than or equal to a predetermined reference pressure.

7. The vehicle fire suppression system according to claim 1, wherein the fire extinguishing nozzle is provided on the refrigerant line adjacent to a driver or electronic parts of a vehicle.

8. The vehicle fire suppression system according to claim 1, wherein the controller is configured to control the multi-way valve and closure of the fire extinguishing nozzle to implement the cooling operation of the cooling device, or to implement an extinguishing operation of the cooling device or of the outside of the cooling device.

9. A method of controlling the vehicle fire suppression system according to claim 1, the method comprising:
   a controller controlling a cooling operation of a vehicle cooling device when an abnormality occurs in the vehicle cooling device; and
   the controller controlling a multi-way valve and a compressor to circulate an extinguishing fluid stored in an extinguishing fluid container through a refrigerant line.

10. The method according to claim 9, wherein the step of the controller controlling the cooling operation of the vehicle cooling device when an abnormality occurs in the vehicle cooling device comprises:
   a sensor measuring a temperature or pressure of a refrigerant;
   the controller stopping an operation of the compressor and completely opening an expansion valve when the abnormality in the temperature or pressure of the refrigerant is detected by the sensor;
   the temperature measuring sensor re-measuring a temperature of the refrigerant; and
   the controller transmitting a failure signal and stopping the operation of the cooling device if there is no abnormality in the re-measured temperature of the refrigerant measured by the sensor.

11. The method according to claim 9, wherein the step of the controller controlling the multi-way valve and the compressor to circulate the extinguishing fluid stored in the extinguishing fluid container through the refrigerant line comprises:
   the controller controlling the multi-way valve to open a valve connected to the extinguishing fluid container; and
   the controller operating the compressor to allow the extinguishing fluid to flow into the compressor so that the extinguishing fluid circulates through the refrigerant line of the vehicle cooling device.

12. The method according to claim 11, further comprising:
   the controller controlling a separate discharge valve so that the extinguishing fluid and the refrigerant are not mixed in the compressor, before the controller operating the compressor to allow the extinguishing fluid to flow into the compressor so that the extinguishing fluid circulates through the refrigerant line of the vehicle cooling device.

13. The method according to claim 9, further comprising:

the controller receiving a fire suppression request signal from a part other than the vehicle cooling device; and the controller, upon the receipt of the fire suppression request signal, controlling a fire extinguishing nozzle provided in the refrigerant line to eject the extinguishing fluid circulating through the refrigerant line out of the cooling device.

14. The method according to claim 13, wherein the step of controlling the fire extinguishing nozzle provided in the refrigerant line comprises:

the controller opening the fire extinguishing nozzle to eject the fire extinguishing fluid out of the refrigerant line, and when a pressure of the refrigerant is below or equal to a predetermined reference pressure, closing the fire extinguishing nozzle.

* * * * *